United States Patent [19]

Culver

[11] 3,876,174
[45] Apr. 8, 1975

[54] UNIVERSALLY ADJUSTABLE MOUNTING APPARATUS

[75] Inventor: Irven H. Culver, Playa Del Rey, Calif.

[73] Assignee: Southwestern Industries, Inc., Los Angeles, Calif.

[22] Filed: May 15, 1972

[21] Appl. No.: 253,631

[52] U.S. Cl. .................. 248/279; 248/16; 248/124
[51] Int. Cl. .... F16m 13/00; A47f 5/00; A47d 15/00
[58] Field of Search .......... 248/279, 285, 286, 287, 248/70, 124, 16, 280, 269, 258, 270, 265, 257

[56] References Cited
UNITED STATES PATENTS

| 289,180 | 11/1883 | Tregurtha | 248/279 |
|---|---|---|---|
| 1,449,509 | 3/1923 | Graves | 248/278 X |
| 2,872,736 | 2/1959 | Abbott | 248/287 X |
| 2,914,829 | 12/1959 | Willemain | 248/278 X |
| 3,396,931 | 8/1968 | Eckstein | 248/280 |
| 3,730,469 | 5/1973 | Shields | 248/287 X |

FOREIGN PATENTS OR APPLICATIONS

| 23,473 | 9/1949 | Finland | 248/270 |
|---|---|---|---|
| 1,402,147 | 5/1965 | France | 248/270 |
| 1,901,685 | 9/1970 | Germany | 248/279 |

*Primary Examiner*—J. Franklin Foss
*Attorney, Agent, or Firm*—Christie, Parker & Hale

[57] ABSTRACT

A locking wafer is provided for inhibiting relative movement between two members angularly about orthogonal axes in which one of the axes coincides with the axis of a bolt and the like connecting the members together to have opposing substantially parallel surfaces. The wafer is adapted to be disposed between the opposing surfaces of the members. The wafer is formed of sheet metal and has a central hole substantially smaller in diameter than the wafer for accomodating the bolt and for positioning the wafer generally concentric to the bolt. Along its periphery, the wafer has an engaging portion which is effectively thickened relative to the remainder of the wafer. This portion is provided for engaging between the opposing member surfaces and for receiving at a location remote from the bolt at least a substantial portion of the inter-member forces produced by tension in the bolt.

The locking wafer is described as, but is not restricted to use as, an element of an improved mounting apparatus for stationary mounting of a desired object, such as a friction wheel distance measuring device, to a desired supportive element in a desired attitude of the object relative to the element at a desired position of the object relative to the element. The mounting apparatus is comprised of sufficient ones and numbers of mounting members selected from a group of different mounting members. Each of the mounting members in the group defines therethrough at least one elongate slot through which a bolt or the like may be passed. Some of the members in the group are of substantially L-shaped configuration having first and second intersecting flanges disposed in substantially perpendicular planes. At least one of the flanges defines a slot. Some of the members in the group define means for fixedly mounting the object thereto.

8 Claims, 22 Drawing Figures

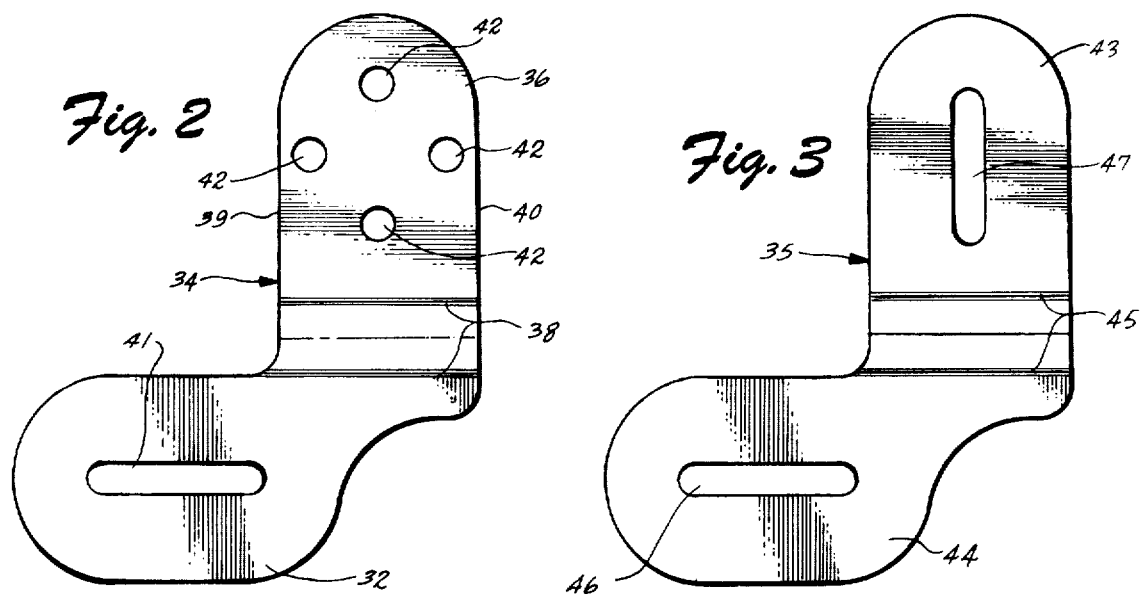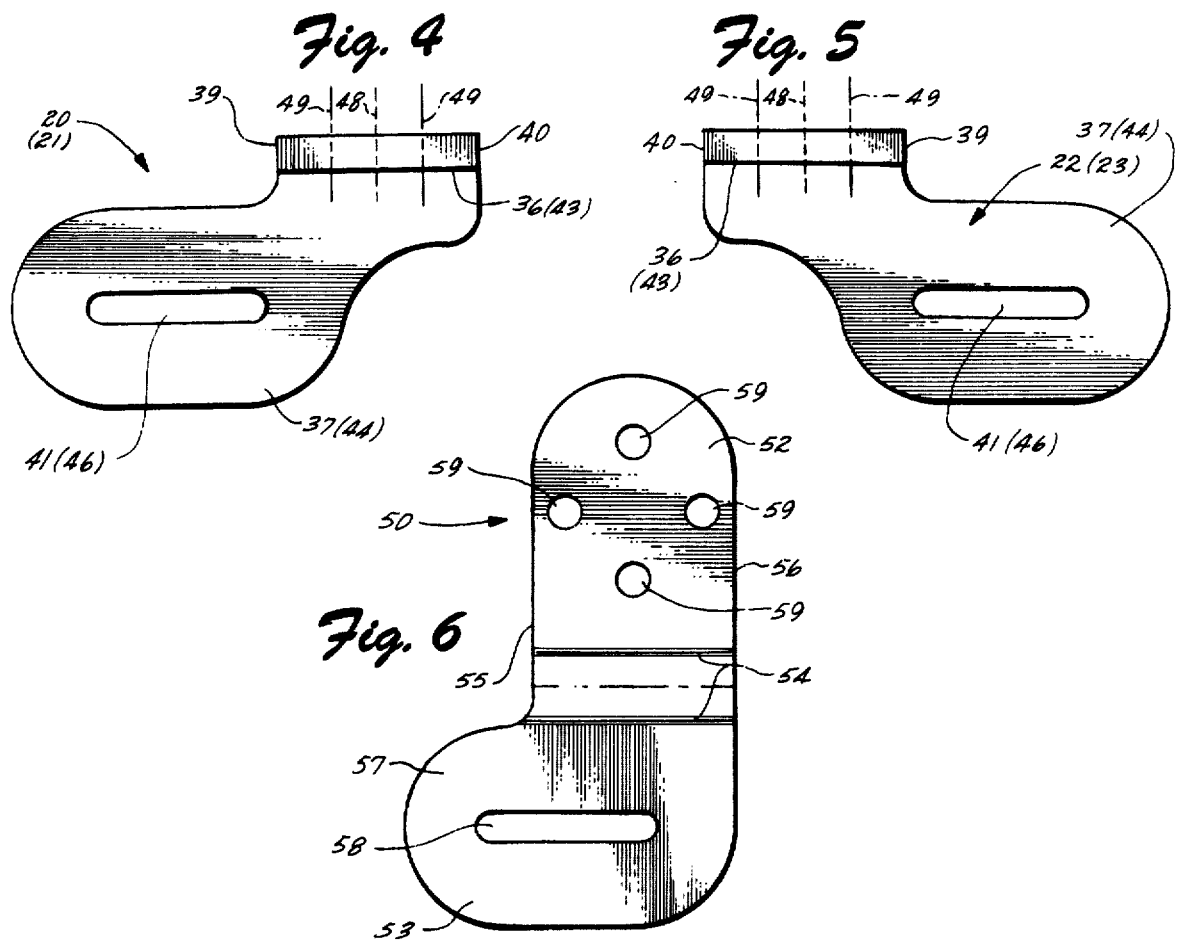

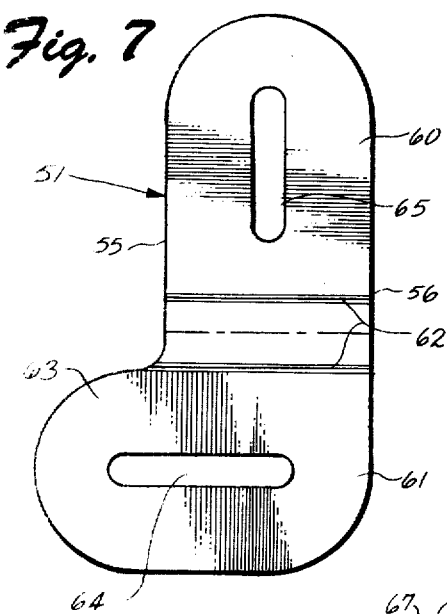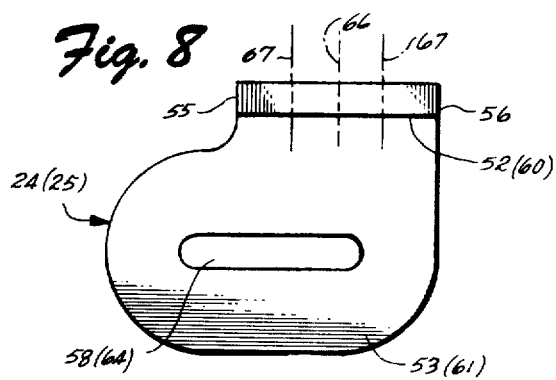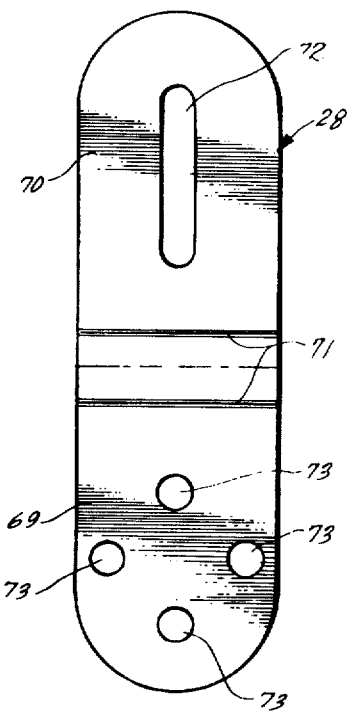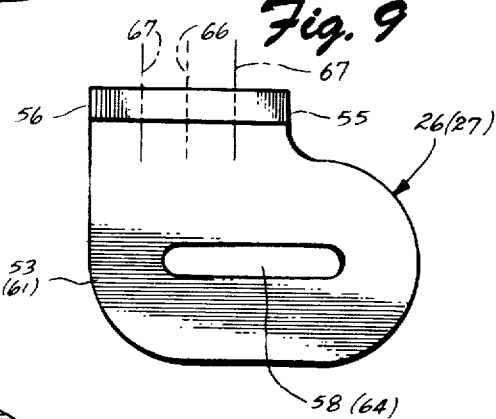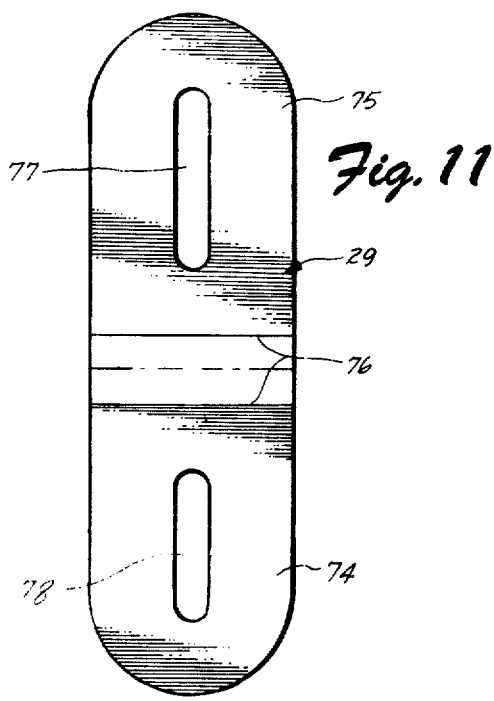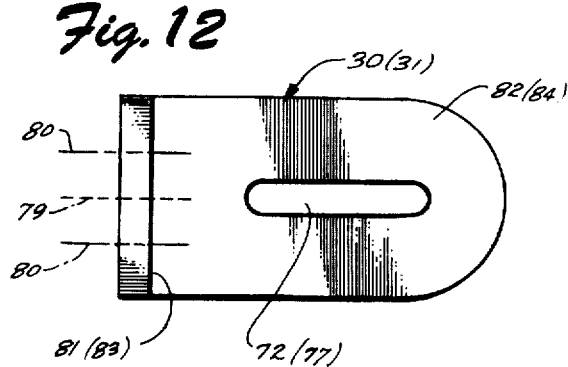

UNIVERSALLY ADJUSTABLE MOUNTING APPARATUS

BACKGROUND OF THE INVENTION

1. Field of the Invention

This invention, in one aspect thereof, relates broadly to the field of fastening and, more particularly, to a wafer-like article for inhibiting relative motion between two members held together by a bolt or the like.

In another aspect, this invention relates to the field of universally adjustable mounting apparatus and, more specifically, to such mounting apparatus of modular building-block flexibility for use with friction wheel distance measuring devices, for example.

2. Review of the Prior Art

The present invention is described herein with reference to the presently preferred embodiment thereof which is an improved mounting system for a friction wheel measuring device. Specifically, the invention is described with reference to a friction wheel measuring device of the type shown and described in U.S. Pat. Nos. 3,378,929 and 3,561,121, for example, which pertain to products marketed under the trademark TRAV-A-DIAL.

Friction wheel measurement devices, such as TRAV-A-DIAL devices, are used extensively to measure the distance one part of a machine tool, such as a lathe carriage, moves relative to an adjacent part of the tool, such as the lathe bed. In such usages, the device is supported from the carriage so that the frictionally-driven metering and tracking wheel of the device engages a carriage-supporting rail defined by the lathe bed. The device is positioned so that the plane of rotation of its metering wheel is disposed in a desired attitude relative to the adjacent rail surface.

Heretofore, the mounting of such measurement devices to machine tools has involved the use of specially designed mounting brackets which varied in design depending upon the type of machine tool involved (lathe, milling machine, or planar, e.g.), upon the brand (Bridgeport, Hardinge, etc.) and model number of the machine tool, and upon the particular application of the device in a given tool (the carriage/bed interface or the cross-slide/carriage interface in a lathe, e.g.). This approach to mounting of such measurement devices was dictated, in part, by the requirement that the mounting of the device to the tool be a stiff mounting for the reasons set forth more fully in U.S. Pat. No. 3,561,120, and also, in part, by the widely differing mounting situations presented by machine tools differing in type, brand and model. The net result was that it was necessary for the manufacturer or distributor of such measuring devices to maintain inventories of a large number of different mounting brackets; this practice is not efficient economically in view of the great number of bracket designs required to encompass the myriad mounting situations possible.

It is apparent, therefore, that a need exists for a simplified and standardized form of mounting bracketry for use with friction wheel measurement devices of the type mentioned above. Ideally, the simplified bracketry should involve a minimum number of elements useful in a maximum number of different mounting situations, thereby greatly reducing the inventory and supply problems heretofore faced by the manufacturer, distributor and, also, by the user of these devices. Further, the simplified bracketry should provide mounting installations of sufficient stiffness to insure proper operations and accuracy of measurement of the measurement devices.

SUMMARY OF THE INVENTION

The present invention provides a simplified and standardized system of mounting bracketry which effectively, efficiently and economically overcomes the problems attendant to the previous practice of mounting friction wheel measurement devices. In overcoming these problems, the invention provides a system which may be used effectively to mount other machine tool accessories to machine tools, or to mount other types of articles and objects to supportive elements other than machine tools. The bracketry system of this invention involves a minimum number of simple components which may be selected and interconnected in myriad ways to be useful in even more mounting situations than were encompassed by the former practice involving specially designed brackets of unitary construction. The present mounting apparatus is simple and easy to adjust to obtain the desired position and attitude of the supported object relative to the supportive element and involves a minimum number of connectors, such as bolts, in the apparatus.

The use of a minimum number of connectors, such as bolts, in the present mounting apparatus is made possible by a novel locking wafer which contributes significantly to the required stiffness of the apparatus and to its nearly universal adjustability. The locking wafer also has utility independent of the present mounting apparatus and may be used to advantage in any situation where it is desired to inhibit relative movement about orthogonal axes between two members connected together by a bolt or the like and having opposing surfaces adjacent the bolt between which the wafer may be engaged.

Generally speaking, this invention, in one of its aspects, provides a wafer for inhibiting relative movement angularly about orthogonal axes between two members connected together by a bolt, for example, and having substantially parallel opposing surfaces between which the wafer is adapted to be disposed. The opposing surfaces need not be flat, but may be concave or convex with either single or double curvature, if desired. The wafer has a hole through it of diameter which is substantially smaller than any dimension across the extent of the wafer in the plane of the hole. The hole is provided for accommodating the bolt and for positioning the wafer relative to the bolt. Along its periphery, the wafer has an engaging portion which is effectively thickened relative to the wafer at locations on the wafer radially inwardly from the engaging portion. The engaging portion is provided for engaging between the opposing surfaces of the two members connected by the bolt and for receiving at a location remote from the bolt at least a substantial portion of the inter-member forces corresponding to, and produced by, tension in the bolt.

In another of its aspects, this invention provides apparatus for universal stationary mounting of an object in any desired attitude relative to a supportive element. The apparatus is comprised of sufficient ones and numbers of mounting members selected from a group of different mounting members of predetermined configuration. The selected members are adequate upon interconnection thereof between the object and the element to dispose the object in the desired attitude relative to the element at a desired position of the object relative to the element. Each of the mounting members in this group defines at least one elongate slot through it. Some of the members in the group are of substantially L-shaped configuration having first and second intersecting flanges disposed in substantially perpendicular planes. At least one of the flanges of each of these latter mounting members defines the slot characteristic of all of the members in the group. Further, some of the members in the group define means for fixedly mounting the object thereto. One of the members selected from the group that comprise the apparatus is connectible to the supportive element by a bolt passed through the slot of the one member, and each adjacent pair of members selected from the group are interconnected by a single bolt passed through the slots of the adjacent members. The apparatus further includes a locking wafer disposed between the one member and the supportive element about the bolt between the one member and the element. A locking wafer is also disposed between each adjacent pair of the selected members about the respective bolts. Each wafer has a central aperture for passage of a bolt therethrough and has, along its periphery, a circumferential engaging portion which is effectively thickened relative to locations inwardly on the wafer from the engaging portion.

DESCRIPTION OF THE DRAWINGS

The above-mentioned and other features of this invention are more fully set forth in the following description of a presently preferred embodiment of the invention, which description is presented with reference to the accompanying drawings, wherein:

FIG. 2 is a part from which two of the mounting members of the present apparatus are formed;

FIG. 3 is another part from which two additional mounting members are formed;

FIGS. 4 and 5 are top plan views of two styles of mounting members which are fabricated by use of the parts shown in FIGS. 2 and 3 to define four separate mounting members of the apparatus of this invention;

FIG. 6 is a plan view of another part which is formed to define two additional mounting members;

FIG. 7 is a plan view of another part which is formed to provide two mounting members;

FIG. 8 is a top plan view representative of two of the mounting members formed from the parts shown in FIGS. 6 and 7, respectively;

FIG. 9 is a top plan view representative of two different mounting members formed from the parts shown in FIGS. 6 and 7, respectively;

FIG. 10 is a plan view of another mounting member;

FIG. 11 is a plan view of still another mounting member of the present mounting apparatus;

FIG. 12 is a plan view representative of two additional mounting members formed by further treatment of the mounting members shown in FIGS. 10 and 11, respectively;

DESCRIPTION OF THE PREFERRED EMBODIMENTS

Figure 1:
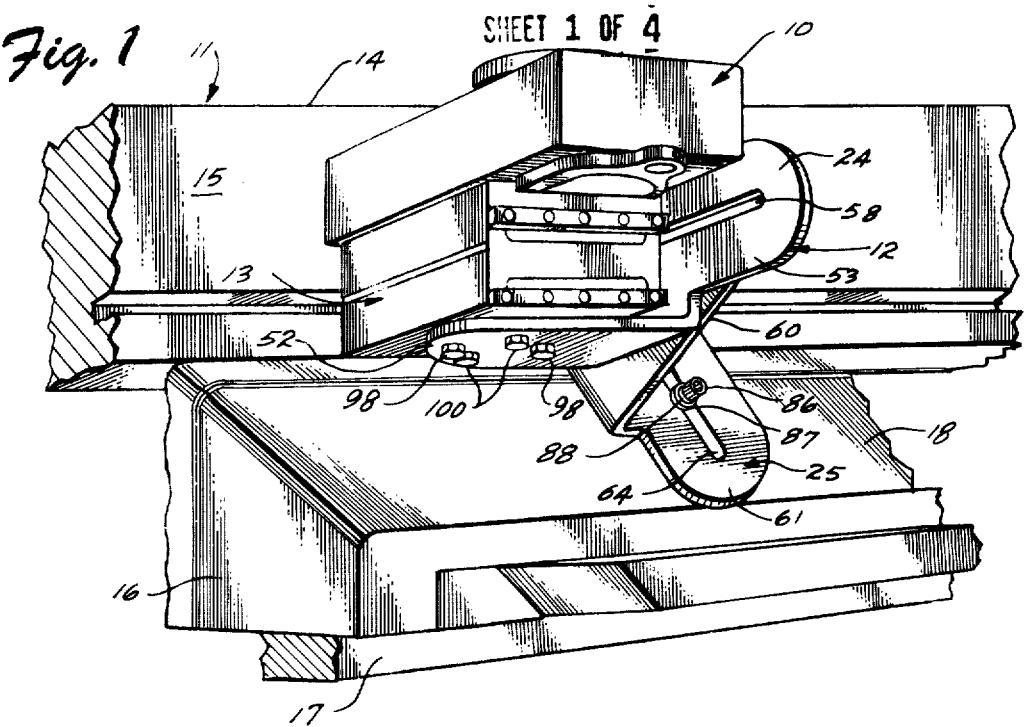
FIG. 1 is a perspective view of a mounting apparatus according to this invention in an exemplary environment of the invention.

FIG. 1 illustrates a TRAV-A-DIAL friction wheel distance measuring device 10 in use in the context of a milling machine 11 and mounted to the milling machine by mounting apparatus 12 according to this invention. A mounting and biasing base 13 of the type described more fully in copending Pat. No. 3,724,082, is interposed between the measuring device and the mounting apparatus. Specifically, the milling machine includes a horizontal table 14 having a machined side edge surface 15 with which the frictionally driven metering and tracking wheel (not shown) of the measuring device is engaged with a force defined by the adjustment of base 13. Table 14 is mounted for horizontal movement relative to a carriage 16 which, in turn, is mounted to a bed 17 for movement along a line which is parallel to the line of movement of table 14 relative to the carriage, the line of movement of the carriage relative to the bed is perpendicular to the line of movement of the table relative to the carriage. Device 10, therefore, is mounted for measurement of the distance which table 14 moves in either direction along its permitted line of movement relative to carriage 16.

It will be observed from FIG. 1 that carriage 16 has a surface 18 which slopes downwardly and outwardly from adjacent the lower edge of table 11 and to which device 10 is mounted by mounting apparatus 12 in association with base 13. The situation illustrated in FIG. 1 is merely exemplary of the many environments in which measurement device 10 may be used to advantage to obtain accurate and repeatable measurements of distance of relative motion. In view of the foregoing remarks, it will be appreciated that the usage of measurement device 10 in the context of a latche or some other machine tool could equally well have been selected as an example of the utility of mounting apparatus 12. Also, as will be made more clear from the following description, it is apparent that mounting apparatus 12 can be used to mount devices other than friction wheel measuring devices to supportive elements and the like other than machine tools.

As noted above, mounting apparatus 12 is actually an integrated system of a plurality of distinctly configured, although similar, mounting members, appropriate ones and numbers of which are selected to provide an effective solution to a particular mounting problem. The several mounting members which constitute the system are shown in FIGS. 2 through 12 and consist of mounting members 20, 21, 22, 23, 24, 25, 26, 27, 28, 29, 30 and 31. FIG. 2 shows the condition of a part 34 at an intermediate stage in the fabrication of mounting members 20 and 22, whereas FIG. 3 shows the condition of a part 35 at an intermediate stage in the manufacture of mounting members 21 and 23.

Part 34 is shown in FIG. 2 in this flat state prior to being formed into either of mounting members 20 or 22. Preferably, stamping, punching and tapping operations are used to define part 34 from a piece of metal plate, such as a 5/16 inch thick plate of C-1018 steel. Five-sixteenths inch thick C-1018 steel plate is the preferred material from which all of the mounting members of the present mounting system are fabricated. In any event, part 34 is of essentially L-shaped configuration and defines first and second flanges 36 and 37 which are interconnected with each other by a bend zone 38. The bend zone is represented by the three parallel horizontal broken lines in FIG. 2; the central one of these broken lines represents the center of the bend zone, whereas the outer lines represent the edges of the bend zone.

First flange 36 has opposite side edges 39 and 40 aligned parallel to the length of the first flange, which length is essentially perpendicular to the length of bend zone 38. Second flange 37 has its length disposed at right angles to the length of first flange 36 within the plane of part 34, and is offset relative to the length of first flange 37 in that the greatest portion of the second flange is disposed laterally from the adjacent side edge 39 of the first flange. An elongated slot aperture 41 is formed through the second flange parallel to the length of bend zone 38 and preferably is disposed in the second flange essentially entirely laterally from the first flange. That is, slot 41 has its end closest to first flange 36 disposed in such a position in part 34 than an extension of the adjacent side edge 39 of the first flange does not traverse the length of slot 41. Four holes 42 are formed through the first flange of part 34 adjacent the end of the first flange opposite from the second flange. Holes 42 preferably are disposed in a square array in part 34 such that the diagonals of the square, i.e., the lines between non-adjacent corners of the square, are disposed perpendicular to and parallel to the length of bend zone 38. Holes 42 are tapped to define identical internal threads; preferably these holes are tapped while part 34 is in a flat state prior to bending thereof to define mounting members 20 and 22.

As shown in FIG. 3, part 35 is similar to part 34 in that it has the same overall shape as part 34. Thus, part 35 has a first flange 43 and a second flange 44. A bend zone 45 is defined transversely of the length of first flange 43 at the intersection of flanges 43 and 44. An elongate slot aperture 46 is formed through the second flange of part 35 to be identical in size and position to slot aperture 41 in the corresponding flange of part 34. In fact, parts 34 and 35 differ from each other only to the extent that an elongate slot aperture 47 is provided through the first flange of part 35, whereasa the whereas holes 42 are provided in the aforementioned array through the first flange of part 34. Slot 47 has its length aligned with the length of the flange in which it is disposed such that, in part 35, slots 46 and 47 are essentially perpendicular to each other.

Slots 41, 46 and 47 and all of the slots in all of the other mounting members, are of the same width to accommodate a standard bolt for interconnecting the mounting members comprising a particular mounting apparatus.

Following the stamping, punching and tapping operations involved in the fabrication of part 34 as it is shown in FIG. 2, the part is subjected to a bending operation to define either of mounting members 20 or 22. In FIG. 4, reference numeral 21 is shown in parentheses following references numeral 20, to indicate that FIG. 4, as such, does not illustrate member 21, but that member 21, fabricated by a suitable bending operation performed on part 35, is so similar to mounting member 20 that, with sufficient explanation, FIG. 4 may accurately and realistically be used to depict both mounting members 20 and 21; this convention avoids unnecessary uninformative repetition of figures in the accompanying drawings. Similarly, in FIG. 5, reference numeral 23 appears in parentheses following reference numeral 22 to indicate that mounting member 23 differs from mounting member 22 only by virtue of being fabricated by use of part 35 rather than part 34.

Specifically, part 34 is used to define either of mounting members 20 or 22 depending upon the direction in which first flange 36 is bent relative to second flange 37, the bend occurring within bend zone 38. That is, viewing part 34 as shown in FIG. 2, if flange 36 is bent upwardly relative to second flange 37, mounting member 20 results. On the other hand, if first flange 36 is bent downwardly relative to second flange 37, mounting member 22 results. Similarly, with reference to part 35 as shown in FIG. 3, mounting member 21 is defined by bending first flange 43 upwardly in bend zone 45 relative to second flange 44, whereas mounting member 23 is defined by bending the first flange of part 35 downwardly relative to second flange 44.

In FIGS. 4 and 5, the position of slot 47 (in the case of mounting members 21 and 23) and also the ones of holes 42 which are aligned along a line perpendicular to the length of bend zone 38 (in the case of mounting members 20 and 22) are represented by broken lines 48 consisting of repetitive dashes, i.e., broken lines represented as follows: - - - - - -. Also in FIGS. 4 and 5, the positions of holes 42 which are aligned along a line parallel to the length of bend zone 38 are represented by broken lines 49 defined by a long dash, two dots and a long dash, i.e., broken lines as follows: -..-.

It is apparent that after each of parts 34 and 35 are bent to define mounting members 20, 21, 22 and 23, the resulting mounting members maintain the L-shaped configuration of the parts from which they are made. Inasmuch as the bends made in parts 34 and 35 to define these mounting members are substantially right-angle bends, the first and second flanges of the mounting members are disposed in substantially perpendicular planes, and slots 41 and 46 are disposed in the mounting members to extend parallel to the line of intersection between the flanges of the mounting members. In the case of mounting members 20 and 21, slots 41 and 46 extend in one direction along the line of intersection between the flanges and are disposed outwardly from one of the two side edges of the first flange, whereas in mounting members 22 and 23, slots 41 and 46 are extended in the opposite direction along the line of intersection between the flanges to lie wholly outwardly of the opposite side edge of the first flange. That is, in mounting members 20 and 21, the second flange of the mounting member extends to the left from the first flange, whereas in mounting members 22 and 23, the second flange extends to the right from the first flange.

FIGS. 6 and 7 are top plan views of two additional parts 50 and 51, respectively, from which mounting members 24, 25, 26 and 27 are defined in a manner similar to the formation of mounting members 20, 21, 22 and 23 from parts 34 and 35. Thus, FIGS. 6 and 7 illustrate the condition of parts 50 in their planar state following the appropriate stamping, punching and tapping operations necessary to define these parts prior to bending. Part 50 is similar to part 34 in that it has a first flange 52 and a second flange 53 which intersect each other via a bend zone 54 which has its length disposed transversely of the elongate extent of first flange 52. The first flange has opposite side edges 55 and 56. In part 50, second flange 53 is not offset from the first flange as is the case in parts 34 and 35. Instead, in part 50, second flange 53 has its major portion disposed in line with first flange 52, but has a lateral extension along the entire side thereof adjacent side edge 55 of first flange 56. An elongate slot aperture 58 is formed through second flange 53 in such a position on the second flange that a minor portion of the length of the slot is disposed within second flange extension 57, but a major portion of slot 58 is disposed between extensions of the side edges 55 and 56 of first flange 52. Four tapped holes 59 are formed through the first flange of part 50 in the same disposition relative to each other and relative to bend zone 54 as is the case with holes 42 in part 34 relative to each other and to bend zone 38.

Part 51, as shown in FIG. 7, differs from part 50 only in the same respect that part 35 differs from part 34. Thus, part 51 has first and second flanges 60 and 61 which intersect each other via bend zone 62, the second flange having a lateral extension 63 identical to extension 57 in part 50. A slot 64 in the second flange of part 51 is identical to the second flange slot of part 50, and an elongate slot aperture 65 is formed through the first flange of part 51 in place of the four holes 59 which characterize the first flange of part 50. As in part 35, slot 65 has its length aligned perpendicular to the length of bend zone 62, i.e., perpendicular to the length of slot 64.

FIGS. 8 and 9 are related to FIGS. 6 and 7 in the same manner that FIGS. 4 and 5 are related to FIGS. 2 and 3. Therefore, FIGS. 8 and 9 illustrate mounting members 24, 25, 26 and 27; the same parenthetical notation is used in FIGS. 8 and 9 relative to FIGS. 6 and 7 as was previously explained as to FIGS. 4 and 5. Also, the same convention is used in FIGS. 8 and 9 with respect to broken lines 66 and 67 as is used in FIGS. 4 and 5 relative to broken lines 48 and 49, respectively.

FIGS. 10 and 11 depict mounting members 28 and 29, respectively, and are identical to each other except to the extent shown. Thus, mounting member 28 is formed from an elongate piece of steel plate or the like of suitable thickness, and has first and second portions 69 and 70 at its opposite ends on opposite sides of a central area which, in FIG. 10, is delineated a bend zone 71. Bend zone 71 is represented in FIG. 10 because mounting member 30 differs from mounting member 28 only in that mounting member 30 is mounting member 28 bent at right angles upon itself through bend zone 71. Bend zone 71 extends transversely of the length of mounting member 28 intermediate the length of the mounting member. The first portion 69 of part 28 defines four holes 73 through the mounting member, these holes being arranged in the same array as holes 42 of part 34, and being disposed in the same relative position and attitude to bend zone 71 as are holes 42 relative to bend zone 38.

Mounting member 29 is essentially identical to mounting member 28, but differs from mounting member 28 only in the same respect that mounting members 20 and 21, for example, differ from each other. Accordingly, mounting member 21 is defined of an elongated piece of steel plate having first and second portions 74 and 75 disposed on opposite sides of a central transverse bend zone 76. An elongate slot aperture 77, identical in size and position to slot 72 of mounting member 28, is formed through the second portion 75 of mounting member 29. In place of the four tapped holes 73 which characterize the first portion of mounting member 28, the first portion of mounting member 29 defines therethrough an elongate slot aperture 78 aligned with slot 77 to be perpendicular to the elongate extent of bend zone 76.

FIG. 12 is a top plan view of mounting members 30 and 31. In the illustration of FIG. 4, the same parenthetical notation has been used which was described above with respect to FIGS. 4 and 5, on the one hand, and FIGS. 8 and 9, on the other hand. Also, the same broken line convention is used with respect to broken lines 79 and 80 as was previously described relative to broken lines 48 and 49 in FIGS. 4 and 5. Mounting member 30 is fabricated by bending mounting member 28 at right angles to itself about bend zone 71 so the first and second portions of mounting member 28 are disposed in intersecting perpendicular planes to define first and second intersecting flanges 81 and 82 of mounting member 30. Similarly, mounting member 31 is defined by bending mounting member 29 at right angles to itself about bend zone 76, by virtue of which mounting member 31 has first and second flanges 83 and 84 which intersect each other and are disposed in substantially perpendicular planes.

As shown in FIG. 1, mounting apparatus 12, used to mount measurement device 10 to milling machine 11, is defined by selecting from mounting members 20-31 sufficient ones and numbers of appropriate mounting members sufficient, upon interconnection of the selected mounting members, to enable the positioning of measurement device 10 at the proper location relative to carriage 16 so that the friction wheel of the measurement device is engageable with surface 15 of the milling machine table. The selected members are also adequate to dispose the measurement device in the proper attitude relative to table surface 15. The proper attitude of measurement device 10 is an attitude in which the frictionally driven metering wheel of the device rotates in a plane approximately parallel to the plane of movement of table 14, i.e., the plane of rotation of the metering wheel is perpendicular to table surface 15 and parallel to the line of movement of table 14 relative to carriage 16. FIG. 1 illustrates that, in the particular mounting situation illustrated therein, mounting apparatus 12 is defined by selecting one mounting member 25 and one mounting member 24 from the group of mounting members comprised of members 20-31.

Figure 13:
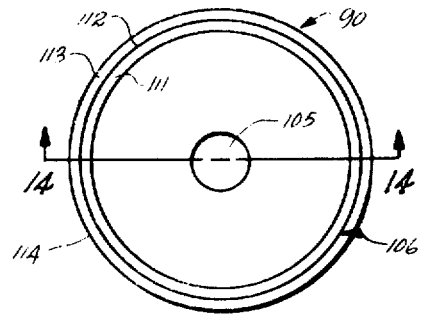
FIG. 13 is a plan view of a locking wafer according to this invention and useful as a component of the mounting apparatus shown in FIG. 1.
Figure 14:
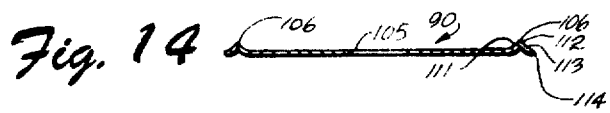
FIG. 14 is a cross-sectional elevation view taken along lines 14—14 in FIG. 3.
Figure 15:
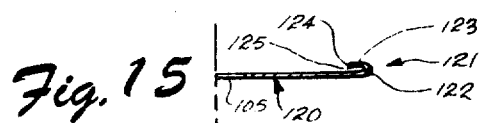
FIGS. 15, 16, 17, 18 and 19, respectively, are half-section views, each similar to the section view of FIG. 14, of respective different locking wafers.
Figure 16:
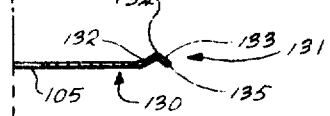
Figure 17:
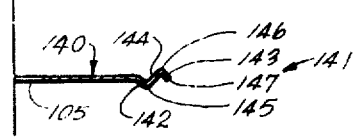

To facilitate the connection of mounting apparatus 12 to carriage 16, and particularly to surface 18 of the carriage, a hole is drilled and tapped in the carriage through surface 18 to accommodate a bolt 86 which is passed through slot 64 of mounting member 25 after the second flange 61 of this mounting member has been registered with surface 18. A flat washer 87 of diameter greater than the width of slot 64 and a lock washer 88 are interposed between mounting member 25 and the head of bolt 86. A locking wafer 90 is disposed between surface 18 and mounting member 25 about the shank of the bolt for engagement between the carriage and the mounting member; locking wafer 90 is illustrated in FIGS. 13 and 14.

Figure 21:
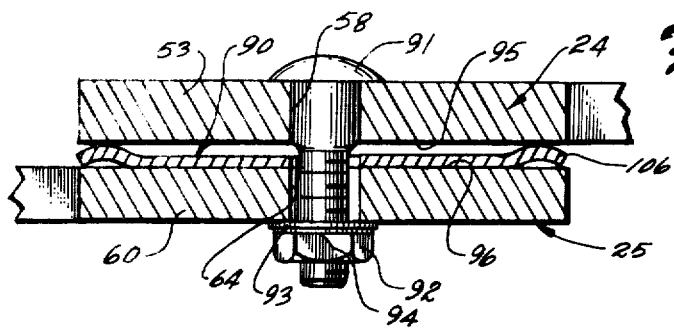
FIG. 21 is a typical cross-section view of the connection between two of the mounting members of the present mounting apparatus illustrating the use of the locking wafer of FIG. 13.

FIG. 21 is a cross-section view through the connection of mounting members 24 and 25 in mounting apparatus 12. This connection includes a carriage bolt 91 having a shank passed through slots 58 and 64 of mounting members 24 and 25, respectively. The head of the carriage bolt is engaged with the surface of the second flange 53 of mounting member 24 which is disposed toward mounting base 13. The bolt is prevented from rotating relative to mounting member 24 by cooperation of the square portion of the bolt shank within slot 58. A nut 92 is engaged with the threaded end of the bolt, and a flat washer 93 and a lock washer 94 are disposed around the bolt shank between the nut and the adjacent surface of the first flange 60 of mounting member 25. Washer 93 is provided to give bearing support for nut 92 on mounting member 25, and lock washer 94 is provided in conjunction with nut 92 to prevent the nut from unscrewing relative to the bolt.

As assembled in mounting apparatus 12, mounting members 24 and 25 have opposing parallel surfaces 95 and 96, respectively. A locking wafer 90 is disposed about bolt 91 between surfaces 95 and 96 for engagement with both of surfaces 95 and 96 along the periphery of the disk. Preferably, the wafer engages surfaces 95 and 96 only at its periphery. Accordingly, the tension in bolt 91 occasioned by tightening of nut 92 produces compression forces (also referred to herein as inter-member forces) which are effective between mounting members 24 and 25 only via the periphery of locking wafer 90. The significance of this manner of transmission of bolt tension forces between mounting members 24 and 25 is more fully set forth in the following description of locking wafer 90 and its function in mounting apparatus 12.

FIG. 21 is typical of the connections between adjacent mounting members in any mounting apparatus defined by appropriate selection of mounting members 20-31.

Figure 22:
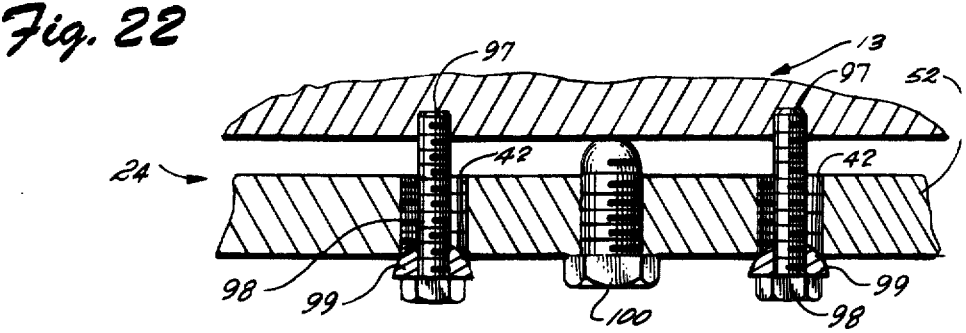
FIG. 22 is a cross-sectional elevation view of the connection of the friction wheel measuring device mounting base, shown in FIG. 1, to the mounting apparatus.

In mounting members 20, 22, 24, 26, 28 and 30, tapped holes 42, 59 and 73 define means for fixedly mounting base 13 to the respective mounting member. More broadly stated, these holes provide means for fixedly mounting a desired object to that mounting member of the appropriate mounting apparatus which is disposed most proximate the object to be supported. The use of these holes to facilitate the mounting of base 13 to mounting member 24 is illustrated best in FIG. 22. The connection of base 13 to mounting member 24 as illustrated in FIG. 22 incorporates many of the principles described in U.S. Pat. No. 3,724,082. Also, the connection illustrated in FIG. 22 provides for fine adjustments in the pitch and tilt of the plane of rotation of the metering wheel of measurement device 10 for the reasons explained in U.S. Pat. No. 3,561,121, for example.

The lower surface of base 13 defines two tapped holes 97 which are disposed along a line perpendicular to the length of the base; these holes are of smaller diameter than tapped holes 42 formed in mounting member 24. A pair of bolts 98 are passed through the two holes 42 in mounting member 24 which are aligned along a line perpendicular to the second flange 53 of this mounting member and into engagement with tapped hole 97 in the base. Accordingly, these bolts have their heads disposed adjacent the underside of mounting member first flange 52, as shown in FIG. 1. Because bolts 98 are of smaller diameter than the diameter of the holes 42 through which they pass, these bolts do not threadedly cooperate with the holes. A hemispherical washer 99 is interposed between the head of each bolt 98 and mounting member 24 to make line contact with the lower end of the respective hole 42, as shown best in FIG. 22. Also, a pair of bolts having shank diameters corresponding to the diameter of holes 42 are passed through the remaining two holes 42 from the underside of mounting member 24 to engage, but not threadedly cooperate with, the lower surface of base 13. Bolts 100 have their ends opposite from the bolt heads formed in a hemispherical configuration so that the bolts make only essentially point contact with the underside of base 13. Because of the disposition of holes 42 in the mounting member 24, it is apparent that bolts 100 make contact with base 13 along a line perpendicular to and midway between the line along which tapped holes 97 are disposed in the base. As shown in FIG. 22, it is preferred that the lower surface of base 13 be spaced above the upper surface of flange 52, and this is why bolts 100 are extended some distance past the upper surface of flange 52. Bolts 100 are adjusted in holes 42 to effect fine adjustments in the tilt of the plane of the metering wheel of device 10 for the reasons set forth in U.S. Pat. No. 3,561,121, for example. Similarly, bolts 98 are effective to hold base 13 down upon the hemispherical upper end of bolts 100 and also, by adjustment of the bolts in holes 97, to produce fine adjustments in the pitch of the plane of rotation of the metering wheel relative to direction of movement of table 14 relative to carriage 16 for the purposes more fully explained in U.S. Pat. No. 3,561,121, for example.

It will be apparent that because holes 42 are of equal diameter and are internally threaded, the disposition of base 13 on the first flange of mounting member 24 may be either transversely of the length of the first flange, as shown in FIG. 1, or aligned parallel to the length of the first flange; in the latter disposition of the base on the first flange, the positions of bolts 98 and 100 are reversed. It is apparent, therefore, that holes 42 provide means for fixedly mounting base 13 on mounting member 24 in either one of two positions relative to the mounting member. Also, depending upon the particular mounting situation, base 13 can be disposed adjacent either side of flange 52.

Because the adjacent mounting members in any mounting apparatus according to this invention are interconnected by only a single bolt cooperating through a pair of slots defined by the adjacent mounting members, it is apparent that the relative positions of the adjacent mounting members are adjustable both linearly and angularly. Also, because the connection of the mounting apparatus to the supporting elements (carriage 16 in the present example) is by way of a single-point bolted connection via a slot, the position of the mounting apparatus on the supportive element is adjustable both linearly and angularly. As a result, this invention provides a universally adjustable apparatus for mounting an object to be supported (such as measurement device 10, with its mounting base 13) in any desired position and attitude relative to a supportive element (such as milling machine carriage 16). Also, the mounting of the object relative to the supportive element is a stationary mounting of substantial rigidity in view of the thickness of the plate used to define the several mounting members, and in view of the secure locking function provided in the apparatus by wafers 90, for example. It is thus apparent that mounting apparatus 12, for example, effectively meets all of the criteria set forth above as being desired in any mounting apparatus for a friction wheel measurement device. By the use of a relatively small number of individual mounting members, a multitude of different mounting apparatuses can be assembled to provide effective solutions to the many diverse mounting problems presented in conjunction with the use of friction wheel measuring device 10, for example. Specifically, 12 different mounting members 20–31 have been described above which are produced from three basic stampings or blank parts. These blank parts are subjected to one or two punching operations to define parts 34 and 35, for example, and each of these punched parts, after being tapped as required, are bent in opposite directions to define a total of four different mounting members.

The versatility of mounting apparatus according to this invention is attributable in part to the presence of a locking wafer, such as locking wafer 90 shown in FIG. 13, in the interconnection between each mounting member within the apparatus, and also in the connection of the mounting apparatus to the supportive element to which the apparatus is connected. As shown best in FIGS. 13 and 14, the presently preferred form of wafer 90 is as a disk of resilient sheet metal having a central hole 105 sized to loosely accommodate a bolt of desired diameter, such as carriage bolt 91 shown in FIG. 21. Wafer 90 is flat across essentially the entirety of its area except for a peripheral portion in which the rim of the wafer is effectively thickened, as shown best in FIG. 14. The thickened portion of wafer 90 defines a circumferential engaging portion 106 which, during use of the disk between opposing parallel surfaces of the two members connected together by a bolt or the like, is first elastically and then plastically deformable and crushable in response to inter-member forces attributable to and corresponding to tension in the bolt or other fastener. The thickness of the wafer inwardly from the circumferential engaging portion is less than the effective thickness of the wafer at the engaging portion. Engaging portion 106 of wafer 90 may be formed by a stamping operation, for example.

Figure 20:
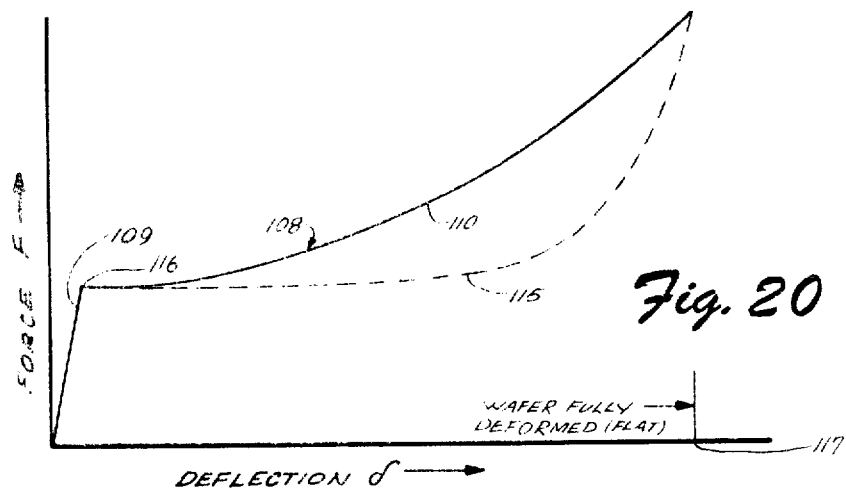
FIG. 20 is a graphical representation of the preferred force/deflection curve applicable to a locking wafer.

FIG. 20 is a graphical representation of the relationship between the deflection of locking wafer 90, for example, and deflecting force applied to the wafer when the wafer is disposed between two objects connected together by a bolt, such as is shown in FIG. 21. In FIG. 20, curve 108 has a first linear portion 109 which represents elastic deflection of the engaging portion of wafer 100 between surfaces 95 and 96, for example. Curve 108 has a second portion 110 which represents plastic deformation of the engaging portion of the wafer. It will be observed that the plastic deformation portion of curve 108 resembles a portion of an exponential curve from its beginning at the upper end 116 of curve portion 109. Throughout portion 110, curve 108 sweeps smoothly with increasing slope upwardly in the direction of increasing force and deflection. Preferably, curve portion 110 resembles a portion of an exponential curve such as a third order parabolic curve.

The operation of locking wafer 90 in the connection shown in FIG. 21 can best be explained by first assuming that mounting members 24 and 25 are connected together by bolt 91 as shown in FIG. 21, but that locking wafer 90 is eliminated from this connection. In such an arrangement, surfaces 95 and 96 of mounting members 24 and 25 abut each other directly. These surfaces are nominally flat and parallel to each other. In practice, however, it will be appreciated that surfaces 95 and 96 will have some irregularities of a local nature in them and that, due to the operations used in fabricating them, these mounting members 95 and 96 may be bowed in one direction or the other relative to each other. If a waferless connection of the type postulated above is assembled in an attempt to provide the rigidity desired in the mounting of measurement device 10 to milling machine carriage 16, it is apparent that nut 92 must be tightened hard down along the shank of bolt 91 to securely clamp mounting members 24 and 25 together between the head of the bolt and the nut. Such tightening of the nut along the bolt produces substantial tension in the bolt.

Two parts so connected by a bolt under considerable tension experience stress concentrations which are effective to cause mounting member 24 to tend to bend concave upwardly and to cause mounting member 25 to bend concave downwardly. That is, tension in bolt 91 tends to induce the mounting members to deform to move away from each other, the amount of such movement increasing proceeding away from the axis of the bolt. The result is that surfaces 95 and 96 tend to be rather securely held together immediately adjacent bolt 91, but to be out of engagement with each other more remote from the bolt. Thus, the resistance to rotation between mounting members 24 and 25 about bolt 91 is a function of the coefficient of friction existing between surfaces 95 and 96, and the effective radius of the annular area of contact between these two surfaces. Because these two surfaces are in contact with each other only adjacent the bolt, the effective radius of the contact area is very small. The net result is that such a bolted connection, free of water 90, has relatively small resistance to rotation of mounting member 24 relative to mounting member 25 about the axis of bolt 91. This fact is inconsistent with the desired rigidity of mounting apparatus 12, for example.

Also, because surfaces 95 and 96 will have certain local irregularities therein, a waferless bolted connection between mounting members 24 and 25 will be susceptible to rocking movements of mounting members 24 and 25 about perpendicular axes passing through, but disposed perpendicular to the axis of bolt 91. It is acknowledged that the susceptibility of such a bolt connection to rocking is considerably less than the susceptibility of mounting members 24 and 25 to twist relative to each other about the axis of the bolt. Nevertheless, any inherent tendency of the connection to manifest rocking movements is also inconsistent with the rigidity desired of mounting apparatus 12.

One way to provide a waferless bolted connection with reduced tendencies to rocking and twisting of mounting members 24 and 25 relative to each other about orthogonal axes associated with bolt 91 would be to provide a machined annular land surface in either or both of surfaces 95 and 96 concentric to the axis of bolt 91, and to make the annular land surface of greatest radius possible. The generation of a machined annular land surface in either or both of surfaces 95 and 96 would greatly increase the cost of manufacture of the mounting members and also would be effective only at one position of the mounting members relative to each other. Thus, this approach to rigidifying and stiffening the bolted connection between mounting members 24 and 25 is entirely inconsistent with the adjustability provided by slots 58 and 64, for example.

When locking wafer 90 is interposed between surfaces 95 and 96 in the arrangement shown in FIG. 1, inter-member forces (i.e., forces between mounting members 24 and 25) attributable to tension in bolt 91 are transferred between the members via wafer engaging portion 106. It is preferred that wafer 90 be fabricated to have the largest diameter possible consistent with its use between two bolted parts. That is, it is preferred that the diameter of wafer 90 be approximately equal to or slightly less than the width of the second flange of mounting member 24 and of the first flange of mounting member 25. Since it is preferred that all of the flanges of the several mounting members described above be of uniform width, i.e., dimension transversely of their length, locking wafer 90 preferably has a diameter equal to or only slightly less than the width of the flange of any single mounting member. Thus, engaging portion 106 of locking wafer 90 cooperates between surfaces 95 and 96 as far as possible from the axis of bolt 91.

Engaging portion 106 is so configured that the wafer is effectively thickened adjacent its periphery to be of greater thickness at that location than anywhere else on the wafer. Accordingly, as nut 92 is tightened along the shank of bolt 91, surfaces 95 and 96 engage the wafer only along the periphery of the wafer. Because the initial deflection characteristics of the wafer are elastic deformation characteristics (as shown best in FIG. 20), the engaging portion of the wafer adapts to the particular configuration of each of surfaces 95 and 96 so that each of these surfaces is engaged with the wafer engaging portion along the entire periphery of the wafer. The transverse configuration (sees FIGS. 14–19, for example) of the engaging portion of the wafer according to this invention preferably is defined such that substantial force must be applied to the wafer from mounting members 24 and 25, for example, to deflect the engaging portion throughout its elastic deflection range. Further application of force to the wafer engaging portion causes the engaging portion to deform plastically, i.e., to experience some crushing deformation. It is obvious that eventually sufficient force may be applied by bolt 91 to mounting members 24 and 25 to cause the locking wafer to have an essentially flat state wherein surfaces 95 and 96 engage the entire area of the wafer. It has been found, however, that such extreme tensioning of bolt 91 is not necessary to achieve a connection between mounting members 24 and 25 which manifests the stiffness and rigidity desired in mounting apparatus 12, for example. It is apparent, therefore, that, in use, the inter-member forces attributable to tension in bolt 91 are transferred between mounting members 24 and 25 only at the periphery of the locking wafer.

The principal factors which are relevant to angular movement of mounting members 24 and 25 relative to each other about the axis of bolt 91 are (1) the tension in the bolt, (2) the coefficient of friction between the wafer and either one of surfaces 95 and 96, and (3) the radius of action of the friction forces about the axis of the bolt; this list of factors assumes that mounting members 24 and 25 are sufficiently stiff to transfer bolt tension forces to the rim of the locking wafer. Specifically, the resistance to differential rotation of mounting members 24 and 25 about the axis of bolt 91 is proportional to the product of the three factors mentioned above. It is apparent that when wafer 90 is provided between mounting members 24 and 25, a substantially greater radius of frictional action is provided in the connection than when the connection is made without the use of locking wafer 90. Thus, locking wafer 90 effectively inhibits angular motion between the mounting members about the bolt axis, and contributes materially to the desired stiffness and rigidity of the mounting apparatus. Also, because the effective engagement between surfaces 95 and 96 is via the locking wafer at its periphery, it is apparent that the locking wafer is also effective to significantly inhibit angular movements between the mounting members about perpendicular axes normal to and passing through the axis of the bolt.

With reference again to FIGS. 13 and 14, engaging portion 106 of wafer 90 is defined by a configurational anomaly in the disk-like body of the wafer adjacent its circumference such that the body of the wafer is deformed in at least one direction out of the plane of the wafer. Thus, in wafer 90, engaging portion 106 has an inner aspect 111 on its inner side in which the material of the disk is curved smoothly out of the plane of the disk to a peak 112 which extends continuously around the axis of symmetry of the disk. Between peak 112 and the extreme outer circumference 114 of the disk, engaging portion 106 has an outer aspect 113 which is also smoothly curved to be concave upwardly of the disk. The rim 114 of the disk is disposed in essentially the same plane as the body of the disk inside engaging portion 106. Engaging portion 106, therefore, has a force/deflection characteristic like that depicted by curve 108 in FIG. 20.

FIGS. 15, 16, 17, 18 and 19 are half-section views of other locking wafers 120, 130, 140, 150 and 160, respectively, according to this invention. In wafer 120, the extreme periphery 122 of the wafer is defined by the outside of a return-bend portion between the wafer body and a circumferential inwardly turned lip 123 which terminates inside periphery 121 at a free end 124. End 124 corresponds to the extreme outer periphery of the blank from which wafer 120 is formed. Lip 123 is spaced from the body of the wafer by a gap 125 which is provided to impart the desired plastically deformable and crushable characteristics to engaging portion 121 of wafer 120.

Locking wafer 130 has an engaging portion 131 in which the circumferential anomaly of the wafer has inner and outer aspects 132 and 133 on opposite sides of an annular peak 134. Inner aspect 132 is of constant slope out of the plane of the major portion (i.e., the body) of the wafer toward peak 134, and outer aspect 133 is of constant slope from the peak to the outer edge 135 of the wafer. Preferably edge 135 is disposed in the plane of the wafer inwardly from engaging portion 131.

An engaging portion 141 of wafer 140 has inner, outer and intermediate aspects 142, 143 and 144, respectively. Inner aspect 142 is inclined with constant slope downwardly out of the plane of the wafer to an inner lower annular peak 145 disposed below the plane of the wafer body. The intermediate aspect 144 of engaging portion 141 is of constant slope and interconnects peak 145 with an upper outer peak 146 disposed above the plane of the wafer. Outer aspect 143 interconnects peak 146 with the extreme periphery 147 of the wafer, has constant slope, and is preferably substantially parallel to inner aspect 142. Engaging portion 141, therefore, is extended in both directions out of the plane of the wafer and still has the extreme periphery 147 of the wafer disposed in the basic plane of the wafer inwardly of the engaging portion.

Figure 18:
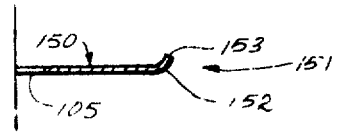
Figure 19:
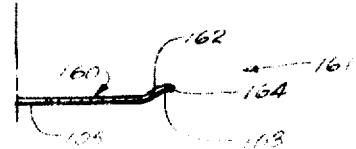

The engaging portion 151 of wafer 150 is defined by curving the outer marginal portion 152 of the wafer material outwardly from the basic plane of the wafer in a curved manner rather than a straight manner. That is, as shown in FIG. 18, the outer marginal portion 152 of the wafer material is deformed to lie outside of the plane of the wafer and the slope of this deformed area increases proceeding radially outwardly on the wafer from hole 105. Wafer 150 has its extreme peripheral edge 153 disposed out of the plane of the wafer.

Wafer 160 has a re-curve engaging portion 161 comprised of an inner aspect 162 which is concave upwardly from the body of the wafer and an adjoining outer aspect 163 which is reversely bent relative to the inner portion so as to be concave downwardly of the wafer. The extreme outer peripheral edge 164 of wafer 160 is disposed out of the plane of the wafer body.

Locking wafer 90, in a presently preferred form hereof useful in mounting apparatus 12, for example, is fabricated from a piece of C-1018 steel having a thickness of 0.032 inch. This locking wafer has an overall diameter of 2.5 inches and has a central hole 0.380 inch in diameter to cooperate with a ⅜ inch diameter carriage bolt. Engaging portion 106 of this wafer has a dimension of 0.08 to 0.10 inch from peak 112 to the side of the wafer opposite from which peak 112 is extended.

It will be observed from FIG. 13 that engaging portion 106 extends continuously around the outer margin of wafer 90, and that wafers 120, 130, 140, 150 and 160 preferably are similar in this respect. It is within the scope of this invention, however, that the wafer may be slotted radially inwardly from its outer periphery partially toward the aperture provided within the body of the wafer for properly locating the wafer relative to a bolt with which the wafer may be used. The presence or lack of slots in the outer portion of the wafer does not contribute beneficially or adversely to the performance of the wafer in use, except to the limited extent that such slots would necessarily decrease the frictional contact area available between the wafer and the opposing part surfaces, such as surfaces 95 and 96, during use of the wafer.

Each of the wafer engaging portions illustrated in FIGS. 14–19 has a force/deflection curve similar to curve 108 shown in FIG. 20. Engaging portions 106 and 121 most closely approximate the form of curve 108, which is descriptive of the preferred elastic and plastic deformation characteristics of the locking wafer. The force/deflection characteristic of wafer 160, for example, is represented by curve 115 shown in broken lines in FIG. 20. Curve 115, in its plastic deformation area to the right of knee 116 at the upper limit of the elastic deformation portion of curve 108, is essentially flat (i.e., horizontal) for a major portion of its length toward the fully deformed flat state of the washer represented at point 117 in FIG. 20.

An optimum locking wafer according to this invention has a deformation characteristic in which the initial portion of the deformation of the engaging portion is elastic in nature, and the remainder of the deformation involves incremental plastic deformation at all points in the force/deflection curve between the limit of elastic deformation and the fully deformed state of the wafer. It is within the scope of this invention, although it is not an optimum situation, that the engaging portion of the wafer may be solid as, for example, would result if the lower portion of lip 123 (see FIG. 15) were engaged directly with the adjacent portion of the wafer body such that gap 125 did not exist in engaging portion 121. Such a wafer would have the characteristic of being effectively thickened adjacent its outer margin so as to receive, at a location remote from the bolt, the inter-member forces existing, due to bolt tension, between two members with which the wafer is used. The lack of a crushable characteristic in this modified form of wafer, i.e., a wafer similar to wafer 120 without the presence of gap 125, does not have the ability of wafer 120 to adapt to local anomalies in the surfaces between which it is engaged during use, but such a wafer would substantially inhibit twisting and rocking of the adjacent parts relative to the bolt with which the wafer might be used.

The foregoing description of a locking wafer according to this invention should not be construed as requiring that the wafer be circular, as shown in FIG. 13, or that the wafer be fabricated of metal as has been mentioned above. The desirable performance characteristics of a locking wafer can be imparted to an element having triangular, rectangular or any other geometric planform configuration desired. Also, it is not required that a positioning aperture be defined through the center of area of the wafer. For example, it is entirely possible, depending upon the use intended for the wafer, that the positioning aperture may be defined at a location adjacent the corner of a wafer having a generally rectangular planform configuration. Further, the locking wafer can be fabricated of any material desired such as a synthetic material, a composition material or the like, again depending upon the application of the wafer and the materials used to define the parts between which the wafer is disposed. For example, in an application where electrical isolation is desired between the two interconnected parts, an electrically non-conductive tension fastener and an electrically non-conductive locking wafer may be used to advantage.

Also, it is not required that the locking wafer be flat within its peripheral engaging portion. For example, a cylindrically curved wafer could be used between opposing concave and convex surfaces of two bolted members; in such a case, the wafer engaging portion would be a peripheral anomaly in the basic cylindrical curvature of the wafer. Similarly, where stabilization of a connection between two bolted members having opposing, generally parallel spherically curved (or otherwise doubly curved) surfaces is desired, the engaging portion may be defined as a peripheral anomaly in a spherically dished wafer, for example.

Again with reference to FIG. 21, even if nut 92 is tightened along carriage bolt 91 sufficiently to fully deform wafer 90 to a completely flat state, whereby surfaces 95 and 96 engage the opposite sides of the wafer over the entire area of the wafer, the elastic and plastic deformation characteristics of the wafer still result in a substantial portion of the inter-member forces due to tension in the bolt being transmitted between the members via the engaging portion of the wafer. Even in its fully deformed state, therefore, wafer 90 effectively inhibits twisting and rocking movements of mounting members 24 and 25 about three orthogonal axes, one of which coincides with the axis of bolt 91. Such motion inhibition is realized where the angular motion inducing forces about the three orthogonal axes are effectively resisted between the parts as far as possible from the axis of the bolt. Locking wafer 90, as well as the other locking wafers described above, is effective to accomplish this desired result.

A locking wafer according to this invention is not analogous to a conventional lock washer. The basic function required of a lock washer or the like is to prevent a bolt or screw from unscrewing relative to the nut or hole with which it is threadedly engaged. A locking wafer according to this invention has nothing to do with unscrewing of a bolt. Instead, a locking wafer is used to prevent angular relative motion between two parts held together by a bolt or screw, and is interposed between the parts rather than between the bolt head, nut or screw head and one of the parts.

The inclusion of locking wafer 90 in mounting apparatus 12 (see FIG. 1) makes it possible to very rapidly locate measuring device 10 in the desired position and attitude relative to surface 15 of table 14, for example. The mounting apparatus, with base 13 for measuring device 10 attached to mounting member 24, is quickly positioned on carriage surface 18 via bolt 86, and bolt 86 is tightened manually as much as possible. Such a thumb-tight condition of bolt 86, by virtue of the presence of a locking wafer between mounting member 25 and carriage 16, produces a relatively secure yet forceably movable connection of mounting member 25 to the carriage. Similarly, the nut associated with the carriage bolt disposed through the slots of mounting members 24 and 25 is screwed to a thumb-tight state. The translational and rotational positional adjustments necessary between mounting member 25 and carriage 16, and between mounting members 24 and 25, can then be made merely by twisting or sliding the mounting members appropriately as required to place measuring device 10 in the proper position and attitude relative to surface 15. Thereafter, a wrench or the like is used to tighten the coupling of mounting member 25 to carriage 16, and to tighten the connection between mounting members 24 and 25. The necessary fine adjustments in the relation between the metering wheel plane and surface 15 can then be made by suitable attention to bolts 98 and 100.

Workers skilled in the art to which this invention pertains will readily appreciate that both the mounting apparatus described above, as well as the locking wafer described herein as a component of the mounting apparatus, may be used to advantage in applications completely independent of the mounting of a friction wheel measuring device to a machine tool or the like. This invention has been described with reference to such applications of the mounting apparatus and the locking wafer purely for the purposes of example and explanation of the principles and characteristics of the mounting apparatus and locking wafer. The foregoing description recognizes that variations, modifications and alterations may be made in the described structures without departing from the scope of this invention. Accordingly, the foregoing description should not be considered as limiting the scope of this invention.

What is claimed is:

1. A set of mounting members for universal stationary mounting of an object in any desired attitude relative to a supportive element, the set comprising at least one of each of the following mounting members:
   a. a first member of substantially L-shaped configuration having first and second intersecting flanges disposed in substantially perpendicular planes, the first flange defining means for fixedly mounting the object thereto and the second flange defining a slot therethrough aligned perpendicular to the plane of the first flange,
   b. a second member of substantially L-shaped configuration having first and second intersecting flanges disposed in substantially perpendicular planes, each flange defining therethrough a slot aligned perpendicular to the plane of the other flange,
   c. a third member of substantially L-shaped configuration having first and second intersecting flanges disposed in substantially perpendicular planes, the second flange having an extension thereof in the plane thereof laterally from one side edge thereof, the first flange defining means for fixedly mounting the object thereto, the second flange defining therethrough a slot aligned parallel to the intersection between the flanges, a portion of the slot being formed through the second flange extension,
   d. a fourth member identical to the third member except that the second flange extension of the fourth member extends laterally from adjacent the other side edge of the second flange,
   e. a fifth member identical to the third member except that the first flange of the fifth member defines no means for fixedly mounting the object thereto but instead defines therethrough a slot aligned perpendicular to the second flange,
   f. a sixth member which differs from the fourth member only in the same way that the fifth member differs from the third member,
   g. a seventh member of substantially L-shaped configuration having first and second intersecting flanges disposed in substantially perpendicular planes, the second flange being substantially offset relative to the first flange in one direction along the intersection between the flanges and having its length disposed substantially parallel to the intersection, the first flange defining means for fixedly mounting the object thereto, the second flange defining therethrough a slot aligned substantially parallel to the intersection between the flanges,
   h. an eighth member identical to the seventh member except that the second flange is offset relative to the first flange in the opposite direction along the intersection between the flanges,
   i. a ninth member identical to the seventh member except that the first flange of the ninth member defines no means for fixedly mounting the object but instead defines therethrough a slot aligned perpendicular to the second flange,
   j. a tenth member which differs from the eighth member only in the same way that the ninth member differs from the seventh member, k. an elongate substantially flat eleventh member defining adjacent one end thereof means for fixedly mounting the object thereto and defining adjacent the other end thereof an elongate slot aligned with the length of the member, and l. a twelfth member identical to the eleventh member except that the twelfth member defines no means for fixedly mounting the object but instead defines therethrough a slot aligned with the length of the member.

2. Apparatus according to claim 1 further including a plurality of locking wafers each fabricated of resilient sheet metal, having a central aperture for passage of a bolt therethrough of diameter sufficient to pass through the slot in any of the mounting members and having along the periphery thereof a circumferential engaging portion effectively thickened relative to the wafer radially inwardly therefrom, the diameter of each wafer being substantially as great as the width of any of the mounting members transversely of the slots thereof.

3. Apparatus according to claim 1 wherein the first flanges of the second, fifth, sixth, ninth and tenth members are of equal width transversely of the elongate extents of the slots therethrough, the eleventh and twelfth members have widths transversely of their elongate extents equal to the width of the second member first flange, the second flanges of the first through tenth members have widths transversely of the elongate extents of the slots therethrough substantially equal to the width of the second member first flange, and all of the slots are substantially equal in width and each slot is substantially centrally disposed in the width of the respective flange.

4. Apparatus according to claim 3 including a plurality of locking wafers each fabricated of resilient sheet metal and having a central aperture substantially equal in diameter to the width of the slots in the mounting members, the wafers having overall diameters substantially equal to the width of the first flange of the second mounting member, each wafer having along the periphery thereof a circumferential engaging portion effectively thickened relative to the portions of the wafer radially inwardly therefrom.

5. Apparatus according to claim 4 wherein the circumferential engaging portions of the wafers are so defined that, when a wafer is disposed between the slotted portions of two of the mounting members and the members are interconnected by a bolt and the like passed through the slots thereof and through the central aperture of the wafer and the bolt is then tightened to clamp the members and the wafer together, the contact of the wafer with the members is initially effectively only via the engaging portion thereof which resiliently deflects to conform to the adjacent surfaces of the members and to establish frictional cooperation with the members.

6. Apparatus according to claim 1 wherein each means for fixedly mounting the object comprises four tapped holes of equal diameter formed through the corresponding mounting members and disposed in a square array in the mounting member.

7. Apparatus according to claim 1 wherein the object is a mounting base for a friction wheel distance measuring device.

8. Apparatus for universal stationary mounting of an object in any desired attitude relative to a supportive element, the apparatus comprising at least one of each of the following mounting members:

a. a first member of substantailly L-shaped configuration having first and second intersecting flanges disposed in substantially perpendicular planes, the first flange defining means for fixedly mounting the object thereto and the second flange defining a slot therethrough aligned perpendicular to the plane of the first flange, b. a second member of substantially L-shaped configuration having first and second intersecting flanges disposed in substantially perpendicular planes, each flange defining therethrough a slot aligned perpendicular to the plane of the other flange, c. a third member of substantially L-shaped configuration having first and second intersecting flanges disposed in substantially perpendicular planes, the second flange having an extension thereof in the plane thereof laterally from one side edge thereof, the first flange defining means for fixedly mounting the object thereto, the second flange defining therethrough a slot aligned parallel to the intersection between the flanges, a portion of the slot being formed through the second flange extension, d. a fourth member identical to the third member except that the first flange of the fourth member defines no means for fixedly mounting the object thereto but instead defines therethrough a slot aligned perpendicular to the second flange, e. a fifth member of substantially L-shaped configuration having first and second intersecting flanges disposed in substantially perpendicular planes, the second flange being substantially offset relative to the first flange in one direction along the intersection between the flanges and having its length disposed substantially parallel to the intersection, the first flange defining means for fixedly mounting the object thereto, the second flange defining therethrough a slot aligned substantially parallel to the intersection between the flanges, f. a sixth member identical to the fifth member except that the first flange of the sixth member defines no means for fixedly mounting the object but instead defines therethrough a slot aligned perpendicular to the second flange, g. an elongate substantially flat seventh member defining adjacent one end thereof means for fixedly mounting the object thereto and defining adjacent the other end thereof an elongate slot aligned with the length of the member, and h. an eighth member identical to the seventh member except that the eighth member defines no means for fixedly mounting the object but instead defines therethrough a slot aligned with the length of the member.

* * * * *